Patented Oct. 16, 1934

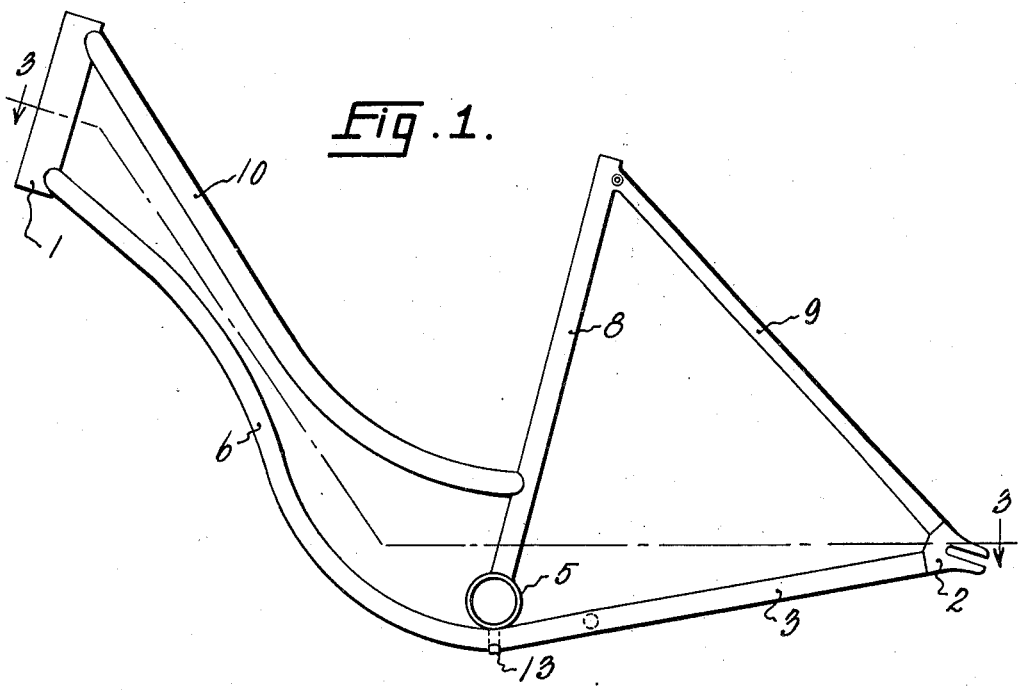
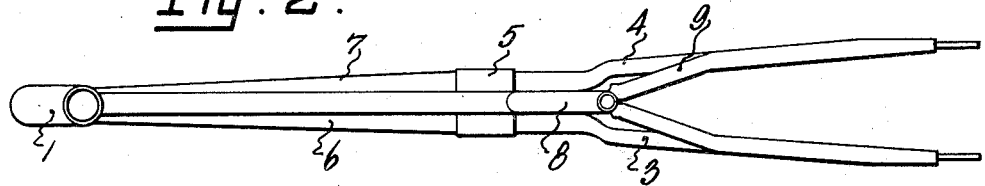
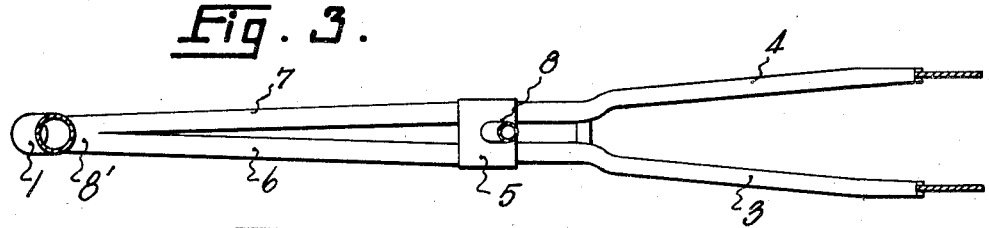
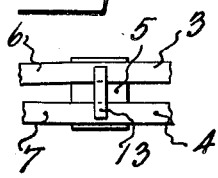

1,977,470

UNITED STATES PATENT OFFICE 1,977,470

BICYCLE FRAME

George W. Clark, Westfield, Mass., assignor to The Westfield Manufacturing Company, a corporation of Massachusetts Application December 13, 1933, Serial No. 702,111

4 Claims. (Cl. 208—93)

This invention relates to an improved bicycle frame.

The improvement is disclosed in the accompanying drawing, in which—

Fig. 1 is a side view of the frame of a girl's bicycle;

Fig. 2 is a top view of Fig. 1;

Fig. 3 is a view taken from just above the line 3—3 of Fig. 1, looking downwardly in the direction of the arrows; and Fig. 4 is a detail view looking from the bottom of the frame where the crank hanger meets its supporting tubes.

Referring to Figs. 1 and 3, the bottom and principal supporting parts of the frame extend in endless tubular form from the bottom end of the front tube 1, nearest to the frame support for the front wheel, to the outer end 2 of the lower rear fork members, nearest to the frame support of the rear wheel. As seen in the drawing, these endless tubular members, forming the bottom part of the frame, consist in the two sides of the lower rear fork members 3 and 4 extended under the crank hanger 5 into the pair of gradually converging bars 6 and 7 which merge into a single tube 8' at their joint with the front tube 1. The merger of the bars 6 and 7 is indicated at 8' in Fig. 3. These two tubes 6 and 7 are integral extensions respectively of tubes 3 and 4. They are merged at 8' and joined to tube 1, preferably by brazing to give a rigid construction. The tubes 6 and 7 are slightly spaced apart at crank hanger 5 and gradually approach their joint 8' at head tube 1. They are in the same plane and each are preferably given a gradually reversed curve as indicated in Fig. 1. The arrangement permits room for the front wheel to turn under bars 6 and 7 and a better supporting construction for crank hanger 5.

The crank hanger 5 is mounted on top and transversely of the pair of long tubes 3—6 and 4—7. And this support of the crank hanger brings it inside the bicycle frame (see Fig. 1). It rests on top of and directly across and above the horizontal and bottom frame tubes to bridge the latter. In this position the downward thrusts of the crank hanger 5 are taken up by the frame without straining any joints between the crank hanger and bottom frame members. I preferably clip the crank hanger 5 in place by the strap 13. The latter is yoke-shaped to partially embrace tubes 6 and 7, and its central portion may be spot welded to the crank hanger 5.

The seat post tube 8 and the upper rear forks 9 may be of usual construction.

In making a girl's bicycle the downwardly curved top bar or tube 10 is preferably mounted in the frame as a single top bar about in the position shown. In making a boy's bicycle the top bar is mounted more nearly in horizontal position or it may be made as a pair of bars gradually diverging from a joint at the top of the steering head or front tube and extending in unbroken form past the seat post tube to include the upper rear fork members.

The continuation as shown of the tubes 3 and 4 forming the lower rear fork, beyond the crank hanger 5 and up to the front tube as portions 6 and 7 where they merge at 8', makes an improved bottom frame support for the crank hanger 5 of the bicycle. In the ordinary prior form of bicycle frame the crank hanger forms a part of the tubular bottom frame support. The lower rear fork members, the lower diagonal tube and the seat post tube are all ordinarily bound together in the bottom part of the frame solely by their respective tubular joints connecting them to the crank hanger. This ordinary construction makes the crank hanger take through its joints the most severe load of any one of the frame parts.

In the improved construction the bottom tubes of the frame extend from the rear end to the front end of the frame without dependence upon the crank hanger as a part of such support. I combine the crank hanger with such a frame support by mounting the crank hanger across and on top of the bottom tubes so as to rest thereon. In this fashion the bottom tubes cradle the crank hanger so as to support this critical part of the frame upon a new kind of foundation. The crank hanger rests directly on such foundation or frame parts and the latter form the bottom part of the supporting frame. The arrangement not only gives an exceedingly strong frame construction but a much better appearing frame with the crank hanger located inside the frame outline. By moving my crank hanger within the frame outline and avoiding all but one of the joints (the one with the seat post tube 8) that are commonly made between the frame tubes and the crank hanger, I have avoided a lot of labor, avoided critical joints between tube members and the crank hanger, made a better supporting frame, and simplified the appearance.

Having disclosed my invention, I claim:

1. In a tubular bicycle frame, the combination of a crank hanger, lower rear fork tubes each having an integral extension passing in contact under the bottom side of the crank hanger and to the front end of the frame, a front tube for the frame to the lower part of which said extensions converge from the crank hanger and are joined in the merged form of a single tube, a seat post tube supported by and rising from the crank hanger, other tubes constituting the rear upper fork members and the means for connecting the upper end of the front tube with the seat post tube to brace the frame, all constructed and arranged to form the whole bottom side of the frame out of the lower rear fork tubes each extending in integral form from one end of the frame to the other and serving as a pair of spaced supports upon which the crank hanger rests.

2. A tubular bicycle frame comprising in combination a front tube, a saddle post tube, upper and lower rear fork tubes, a tube to brace the upper end of the front tube with the saddle post tube, a crank hanger tube at the bottom end of the saddle post tube, said lower fork tubes each having an integral forward extension contacting the under side of the crank hanger tube and from that contact converging toward its companion tube so as to merge into single tube form as the said extensions bend upwardly and reach the bottom portion of the front tube, said single tube form being permanently joined to the said front tube.

3. A tubular frame for a girl's bicycle, comprising in combination a single front tube for handle bars and the front fork post, a single rear tube parallel to the front tube and much longer for extending between the seat post and crank hanger, a single tube fastened to the upper end of the front tube and the lower part of the rear tube to brace them, a pair of tubes starting from single tube formation fastened to the lower end of the front tube and diverging side by side from the single tube formation to forked form as they extend downwardly to pass below the rear tube and at their outer ends form the lower rear fork members, a crank hanger located to rest on the top sides of the forked tubes and between the latter and the bottom end of the rear tube to which the crank hanger is fastened, and an upper rear fork member to complete the frame.

4. A tubular frame for a girl's bicycle comprising in combination a front tube, a crank hanger, spaced tubes extending from the crank hanger rearwardly to form the rear lower fork and forwardly and upwardly to connect with the lower end of the front tube, the upwardly extending tubes converging and merging into single tube formation for meeting and connection with said front tube, an upper rear fork, a single tube connecting the crank hanger with the upper ends of the latter fork, and a downwardly slanting single tube connecting the upper end of the front tube with said other single tube slightly above the crank hanger.

GEORGE W. CLARK.